(12) United States Patent
Vidyashankar et al.

(10) Patent No.: US 12,133,159 B2
(45) Date of Patent: Oct. 29, 2024

(54) IN-BAND SIGNALING OF ACCESS NETWORK INFORMATION ALONG THE USER-PLANE FOR DIFFERENTIATED CHARGING

(71) Applicant: Cisco Technology, Inc., San Jose, CA (US)

(72) Inventors: Raghavendra Suryanarayanarao Vidyashankar, Bangalore South (IN); Santhosh Shenoy Panambur, Karnataka (IN); Om Prakash Suthar, Bolingbrook, IL (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 412 days.

(21) Appl. No.: 17/068,031

(22) Filed: Oct. 12, 2020

(65) Prior Publication Data
US 2022/0116854 A1 Apr. 14, 2022

(51) Int. Cl.
*H04W 48/08* (2009.01)
*H04W 4/24* (2024.01)
(Continued)

(52) U.S. Cl.
CPC ............ *H04W 48/08* (2013.01); *H04W 4/24* (2013.01); *H04W 36/0027* (2013.01); *H04W 36/0066* (2013.01); *H04W 36/14* (2013.01); *H04W 48/18* (2013.01); *H04W 88/16* (2013.01); *H04W 92/02* (2013.01)

(58) Field of Classification Search
CPC ... H04W 48/08; H04W 4/24; H04W 36/0027; H04W 36/0066; H04W 36/14; H04W 48/18; H04W 88/16; H04W 92/02
See application file for complete search history.

(56) References Cited

U.S. PATENT DOCUMENTS 10,567,245 B1 * 2/2020 Patil ........................ H04L 69/22
2007/0162289 A1 7/2007 Olsson et al.
(Continued)

OTHER PUBLICATIONS

3GPP, "3rd Generation Partnership Project; Technical Specification Group Services and System Aspects; System architecture for the 5G System (5GS); Stage 2 (Release 16)," 3GPP TS 23.501 V16.6.0, Sep. 2020, 447 pages.
(Continued)

*Primary Examiner* — Steven S Kelley
(74) *Attorney, Agent, or Firm* — Edell, Shapiro & Finnan, LLC

(57) ABSTRACT

Techniques are provided to inform a mobile packet core of the access network/radio access technology (AN/RAT) change with the use of in-band signaling along the user plane and hence reduce signaling between radio access network and mobile packet core network. A new extension header content is defined to signal the AN/RAT change information, Cell Group changes and acknowledging the same. Further still, a method is provided to handle AN change notification for split bearer scenarios by introducing a split bearer flag for the mobile packet core to be notified of the predominant access type serving the subscriber data session in 5G Non-Stand Alone (NSA) Option-3, Option-3A and Option-3X, so that static or dynamic configurations can be applied by the mobile core network accordingly.

20 Claims, 11 Drawing Sheets

(51) Int. Cl.
*H04W 36/00* (2009.01)
*H04W 36/14* (2009.01)
*H04W 48/18* (2009.01)
*H04W 88/16* (2009.01)
*H04W 92/02* (2009.01)

(56) References Cited

U.S. PATENT DOCUMENTS

| | | | | |
|---|---|---|---|---|
| 2009/0296655 | A1* | 12/2009 | Tamura | H04L 47/34 370/331 |
| 2010/0329243 | A1* | 12/2010 | Buckley | H04L 65/1069 370/352 |
| 2011/0040881 | A1* | 2/2011 | Coulas | H04L 65/1083 709/227 |
| 2012/0087330 | A1 | 4/2012 | Zhu et al. | |
| 2012/0140686 | A1* | 6/2012 | Wen | H04W 28/065 370/310 |
| 2015/0043390 | A1* | 2/2015 | Wang | H04W 24/02 370/280 |
| 2016/0198336 | A1 | 7/2016 | Kim et al. | |
| 2016/0255665 | A1* | 9/2016 | Futaki | H04W 52/04 370/329 |
| 2016/0294660 | A1* | 10/2016 | Salvador | H04L 43/106 |
| 2016/0295465 | A1* | 10/2016 | Rommer | H04W 76/16 |
| 2017/0034756 | A1* | 2/2017 | Faccin | H04W 48/06 |
| 2017/0295524 | A1* | 10/2017 | Malkamaki | H04W 36/0064 |
| 2017/0366473 | A1* | 12/2017 | Park | H04W 8/04 |
| 2018/0242188 | A1* | 8/2018 | Pang | H04W 28/22 |
| 2018/0288826 | A1* | 10/2018 | Chiba | H04W 76/34 |
| 2019/0387424 | A1 | 12/2019 | Yiu et al. | |
| 2020/0077331 | A1 | 3/2020 | Horn et al. | |
| 2020/0092198 | A1 | 3/2020 | Faccin et al. | |
| 2020/0092758 | A1 | 3/2020 | Youn et al. | |
| 2020/0100156 | A1* | 3/2020 | Liu | H04W 28/0268 |
| 2020/0221339 | A1 | 7/2020 | Gottwerth et al. | |
| 2020/0228260 | A1* | 7/2020 | Jonsson | H04W 76/12 |
| 2022/0224553 | A1* | 7/2022 | Dauneria | G06K 19/08 |
| 2022/0295580 | A1* | 9/2022 | Vega | H04W 76/12 |
| 2022/0408301 | A1* | 12/2022 | Parikh | H04M 15/61 |

OTHER PUBLICATIONS

3GPP, "3rd Generation Partnership Project; Technical Specification Group Core Network and Terminals; General Packet Radio System (GPRS) Tunnelling Protocol User Plane (GTPv1-U) (Release 16)," 3GPP TS 29.281 V16.1.0, Sep. 2020, 33 pages.

3GPP, "3rd Generation Partnership Project; Technical Specification Group Core Network and Terminals; Policy and Charging Control (PCC); Reference points (Release 16)," 3GPP TS 29.212 V16.4.0, Sep. 2020, 287 pages.

3GPP, 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3; (Release 16), 3GPP TS 29.274 V16.5.0, Sep. 2020, 396 pages.

ETSI, "LTE; Evolved Universal Terrestrial Radio Access Network (E-UTRAN); S1 Application Protocol (S1AP) (3GPP TS 36.413 version 15.3.0 Release 15)," Technical Specification, ETSI TS 136 413 V15.3.0, Sep. 2018, 379 pages.

Kaki, et al., "Optimizing Signaling in 5G Nonstandalone Network Deployments Enabled With Presence Reporting Area," Technical Disclosure Commons, https://www.tdcommons.org/dpubs_series/1599, Oct. 16, 2018, 12 pages.

Yilmaz, et al., "Overview of LTE-NR Dual Connectivity," IEEE Communications Magazine, May 2019, 18 pages.

* cited by examiner

IN-BAND SIGNALING OF ACCESS NETWORK INFORMATION ALONG THE USER-PLANE FOR DIFFERENTIATED CHARGING

TECHNICAL FIELD

The present disclosure relates to mobile network communications.

BACKGROUND

Many incumbent mobile service operators are deploying fifth generation (5G) as Non-Stand Alone (NSA) with fourth generation (4G) Control and User Plane Separation (CUPS). NSA leverages the existing Long Term Evolution (LTE) radio access and Evolved Packet Core (EPC) to anchor 5G New Radio (NR) devices using the Dual Connectivity (DC) feature. NSA Option-3X is a widely accepted deployment option where the radio access network is composed of a 4G eNB as the master node and a 5G gNB as the secondary node. Deployments of 5G gNB are spotty and not contiguous across a large geography.

A DC-enabled User Equipment (UE) first registers for mobile data service with the 4G EPC network. Based on an UE measurement report, the 4G eNB communicates with the 5G-NR gNB and enables the UE to simultaneously connect to the 4G and 5G networks. This allows the Radio Access Network (RAN) to move one or more UE bearers seamlessly between different access types (Evolved Universal Terrestrial Radio Access Network (EUTRAN)/LTE/4G and NR/5G).

DESCRIPTION OF EXAMPLE EMBODIMENTS

Overview

In accordance with an example embodiment, techniques are provided to inform a mobile packet core of the access network/radio access technology (AN/RAT) change with the use of in-band signaling along the user plane and hence reduce signaling between radio access network and mobile packet core network. In one form, a method is provided for use in a communication system that includes at least a first radio access network of a first radio access technology type and a second radio access network of a second radio access technology type. The method is performed at a radio access network element of the second radio access network, and comprises receiving a data transmission from a user equipment that has dual connectivity capabilities for communication in both the first radio access network and the second radio access network. The method includes determining whether there is a change in radio access technology type for the user equipment indicating that the user equipment has handed over from the first radio access network to the second radio access network. The method further includes, based on the determining, encapsulating data from the user equipment in a packet that includes a header comprising an indication whether there is a change of radio access network, to form an encapsulated packet. The method further involves sending the encapsulated packet to a mobile core network.

In another form, a method is provided that is performed at a gateway element in the mobile core network. The method includes obtaining an encapsulated packet representing a data transmission sent by a user equipment that has dual connectivity capabilities for communication in both the first radio access network and the second radio access network. The encapsulated packet includes a header that indicates whether there is a change in radio access network for the user equipment. The method involves evaluating the header of the encapsulated packet. The method includes determining whether there is a change in radio access network for the user equipment based on the evaluating. The method involves forwarding the encapsulated packet to a user plane entity in the mobile core network.

Example Embodiments

E-UTRAN and New Radio, Dual Connectivity (EN-DC) technology enables the introduction of 5G services with higher data rates and other capabilities. This approach permits service providers to roll out 5G services on existing 4G core networks with NSA capabilities.

Figure 1:
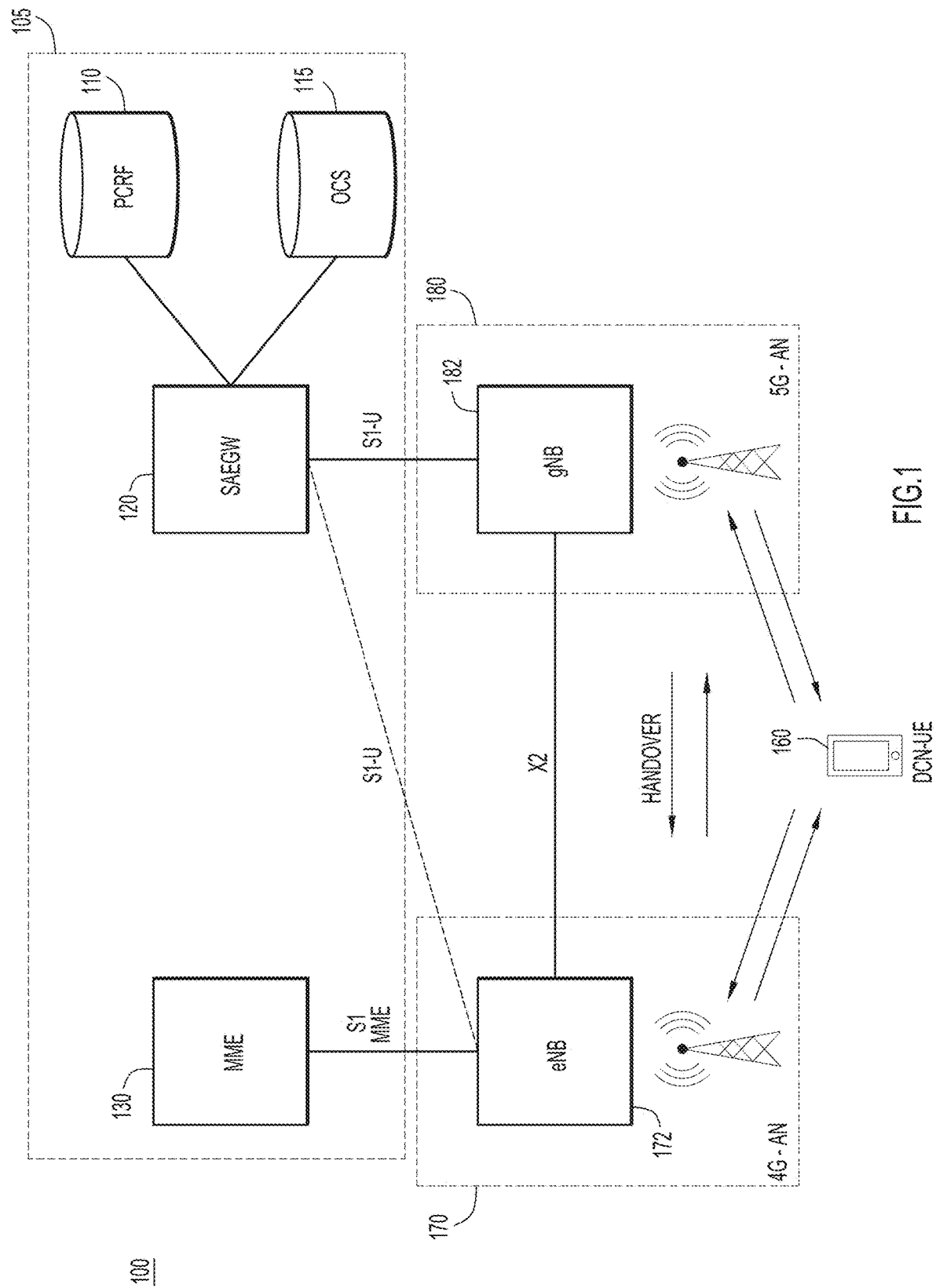
FIG. 1 is a block diagram illustrating an access network handover situation for Dual Connectivity-enabled user equipment for which solutions are presented herein.

Reference is first made to FIG. 1. FIG. 1 shows a mobile network 100 that includes a mobile core network 105 having a Policy and Charging Rules Function (PCRF) 110, an Online Charging System (OCS) 115, a System Architecture Evolution Gateway (SAEGW) 120, and a Mobility Management Entity (MME) 130. The PCRF 110 and OCS 115 may manage Policies and Quota for User Equipment (UE) subscribers/users. FIG. 1 shows a UE 160, as an example.

FIG. 1 shows a RAN 170 that is based on a first access network type, such as 4G/LTE access network (AN). RAN 170 includes, in an oversimplified form, an evolved NodeB (eNB) 172. In addition, FIG. 1 shows a RAN 180 that is based on a second access network type, such as 5G/NR AN. The RAN 180 includes, in an oversimplified form, next generation NodeB (gNB) 182. UE 160 has EN-DC capabilities such that it can connect simultaneously to eNB 172 and to gNB 182. eNB 172 is also referred to as an LTE Master Node eNB (MeNB). In addition, gNB 182 is also referred to as a Secondary Node gNB (SgNB).

The interfaces between the various entities shown in FIG. 1 are indicated as such by name in the figures. There is an S1-MME interface between MME 130 and eNB 172. There also is an S1-U interface between SAEGW 120 and eNB 172, and between SAEGW 120 and gNB 182. There is an X2 interface between eNB 172 and gNB 182.

It should be understood that the RAN 170 and RAN 180 may be based on dedicated physical entities, such as eNBs and gNBs, or may be implemented as virtualized RANs (vRANs), including disaggregated vRANs. The eNB 172 and gNB 182 may be disaggregated in a vRAN architecture into different vRAN components.

In some instances, a vRAN architecture can be implemented as a disaggregated vRAN architecture that includes the split of a base station, such as an eNB or a gNB, into a Central (or Centralized) Unit (CU), one or several Distributed Units (DUs), and one or several Radio Units (RUs). Further disaggregation may include separation of the CU into a Central Unit Control Plane (CU-CP) component and a Central Unit User Plane (CU-UP) component. In some instances, certain vRAN components may also be referred to as virtualized components (e.g., virtualized DU (vDU) components, and/or virtualized CU (vCU) components). For a vRAN architecture, one or more RU(s) can interface with a DU component, which further interfaces with a CU-CP component and a CU-UP component. In some instances, such as for shared cell vRAN architectures, multiple DUs (each interfacing with corresponding RU(s)) can interface with a CU-CP component and a CU-UP component.

NSA Options, such as Option-3, Option-3A and Option-3X which related to LTE-Assisted options for EN-DC scenarios, have been developed to deal with various ways that mobile network operators may evolve between different access network technologies in their deployments. In Option 3, there is no connectivity from the gNB 182 to the mobile core network 105. In Option-3A, the gNB 182 has an S1-U interface to the mobile core network 105, but no X2 interface to the eNB 172. In Option-3X, the gNB 182 has an S1-U interface to the mobile core network 105 and an X2 interface to the eNB 172. The techniques presented herein are applicable to Option-3, Option-3A and Option-3X.

Split bearer is a functionality that allows instantaneous traffic flow switching between E-UTRAN and NR without having to switch the S1-U end point in the 5G NSA Option-3X Architecture. Handover across an access network, such as between 4G and 5G, will not trigger any signaling towards the mobile packet core network.

Use cases, such as differentiated charging based on AN, cannot be implemented if the mobile packet core network is not aware of the serving access network. In addition, there is a need to handle scenarios where the bearer is split at the Packet Data Convergence Protocol (PDCP) layers, such as when both the Radio Link Control (RLC) layer and PDCP layer are serving different radio Access Technologies (RATs). For example, the S1-U (PDCP) is anchored at a secondary gNB (SgNB) and the UE is served by the Master eNB (MeNB) radio through the X2 interface. This is described further below in connection with FIG. 6.

In the current 5G NSA Option-3X deployments, secondary node (gNB) addition, release or modification procedures are almost transparent to the mobile packet core network elements, such as the SAEGW 120, PCRF 110, and OCS 115. That is, there is no signaling indication to the mobile packet core to indicate whether the UE 160 is served by either the 4G/LTE AN (that uses a first Radio Access Technology (RAT) type) or the 5G/NR AN (that uses a second RAT type). This means that policy and charging specific to RAT types cannot be applied. Presented herein are methods to address this shortcoming using an in-band signaling approach in the User-Plane (UP).

A new in-band signaling is provided in the User-Plane, such as in the General Packet Radio Service (GPRS)-User Plane (GTP-U) protocol, which can signal to the mobile packet core about the change in the AN. The in-band signaling is used for exchanges between the eNB 172 and the SAEGW 120, between the gNB and the SAEGW 120, and between the eNB 172 and gNB 182.

Figure 2A:
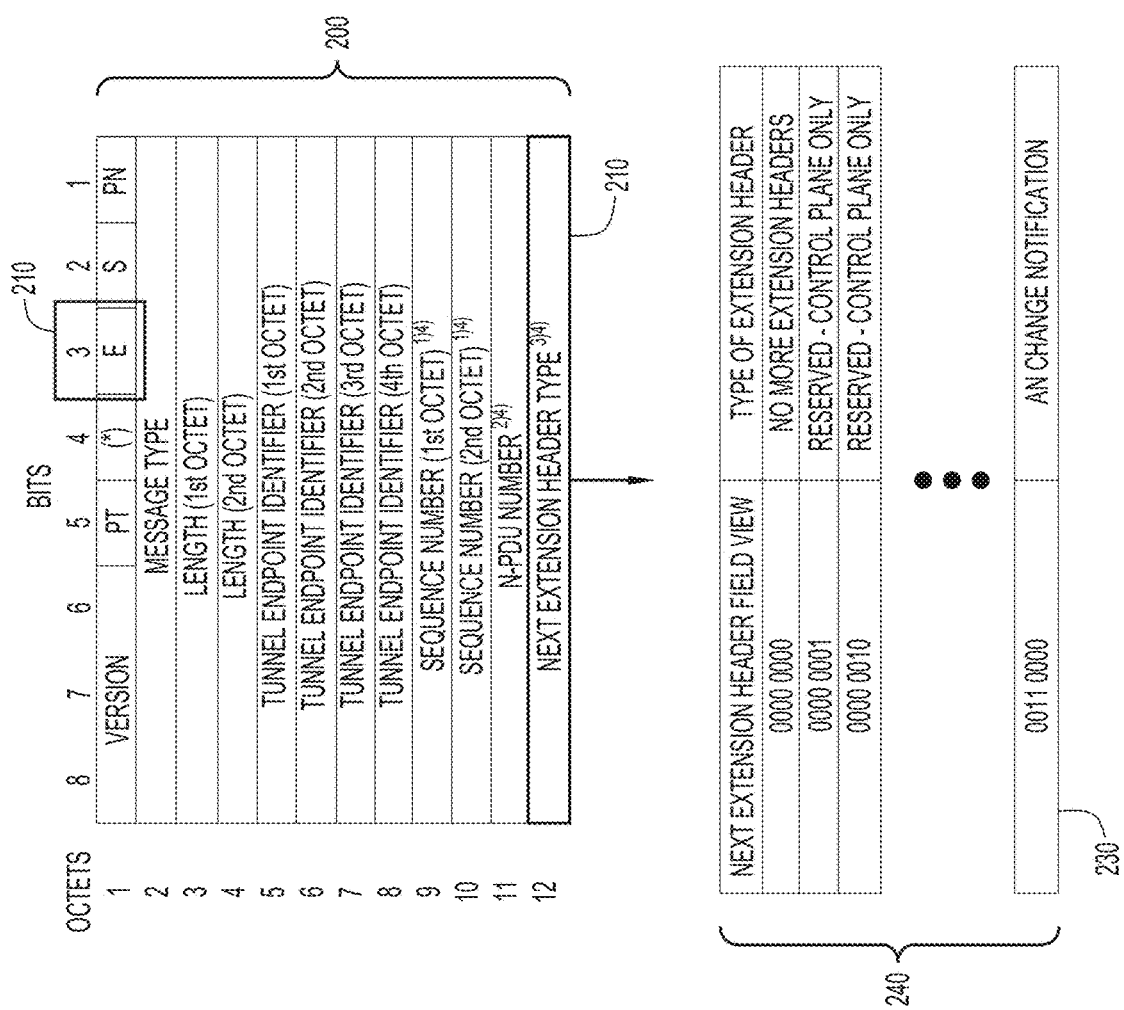
FIGS. 2A and 2B illustrate diagrams of a user plane extension header used to signal information relevant to an access network handover, according to an example embodiment.
Figure 2B:
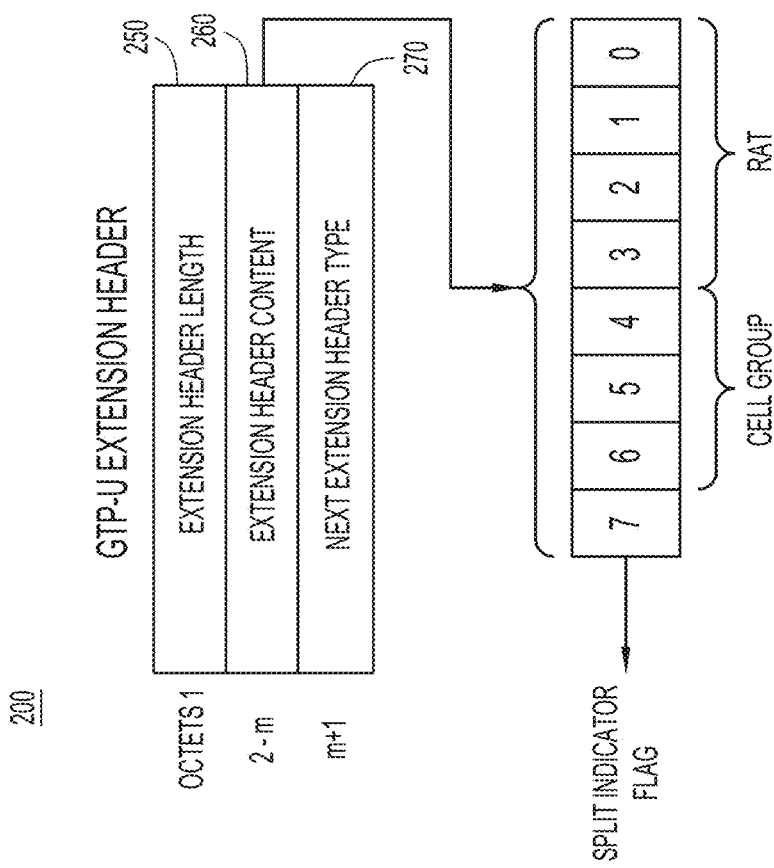

Reference is now made to FIGS. 2A and 2B for a description GTP-U extension header provided to signal changes related to the AN for a UE. As shown in FIG. 2A, a new extension header "AN Change Notification" is provided as part of GTP-U header 200 as set forth in 3GPP TS 29.281, where:

Octet-1: the 'E' bit 210 in the GTP-U extension header 200 is set to 1.

Octet-12: As shown at 220, a new Next Extension Header Type 'AN Change Notification'='0011 0000' i.e., 0x30 is introduced, as shown at 230, among a plurality of extension header field values 240 already defined.

Extension Header length: Set to 0x01

FIG. 2B shows another view of GTP-U extension header 200, including an extension header length 250, extension header content 260 and a next extension header type 270. The extension header content 260 is used as an in-band flag to indicate the switching of bearers across ANs. The flag may be of 8-bits in length.

Bits 0-3 (LSB) indicate the RAT Type such as E-UTRAN, NR etc.

Bits 4-6 (MSB) indicate the Cell group the AN belongs to, i.e., Master Cell Group (MCG) or Secondary Cell Group (SCG).

Bit 7 indicates the Split Bearer Flag.

This provides flexibility in applying policies specific to either cell group or RAT type. The assumption is that the S1-U end point does not change with the RAT change. The extension headers may only be included if there is a change in the RAT, and not included otherwise.

A new extension header context may be added to acknowledge the AN information change notification. For example, as shown in Table 1 below, a X111:1111 signals User Plane (UP) acknowledgment (ACK) of the AN change notification.

TABLE 1

GTP-U Extension Header Content

| Cell Group (Bits 4-7) | RAT (Bits 0-3) | Use |
|---|---|---|
| XXXX | 0000 | Reserved |
| XXXX | 0001 | 4G |
| XXXX | 0010 | 5G-NR |
| X000 | XXXX | Reserved |
| X001 | XXXX | Master Cell Group (MCG) |
| X010 | XXXX | SCG (Secondary Cell Group) |
| 1XXX | XXXX | '1' Split Bearer Enabled '0' Split Bearer Disabled |
| X111 | 1111 | ACK (UP -> MeNB/SgNB) |

Figure 3:
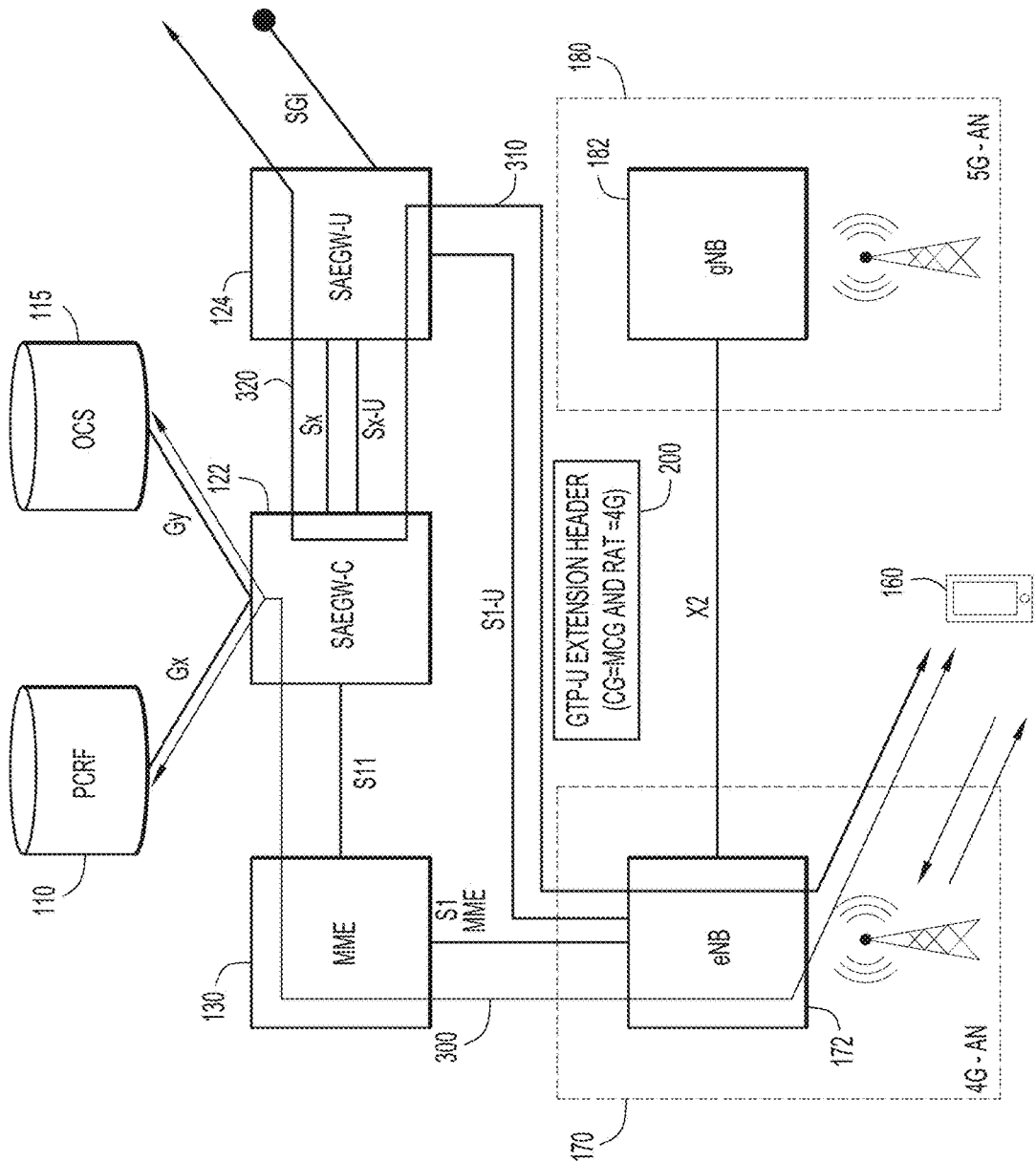
FIGS. 3-5 illustrate operational diagrams for different scenarios of a Dual Connectivity-enabled user equipment in which the extension header is used for signaling access network changes, according to an example embodiment.
Figure 4:
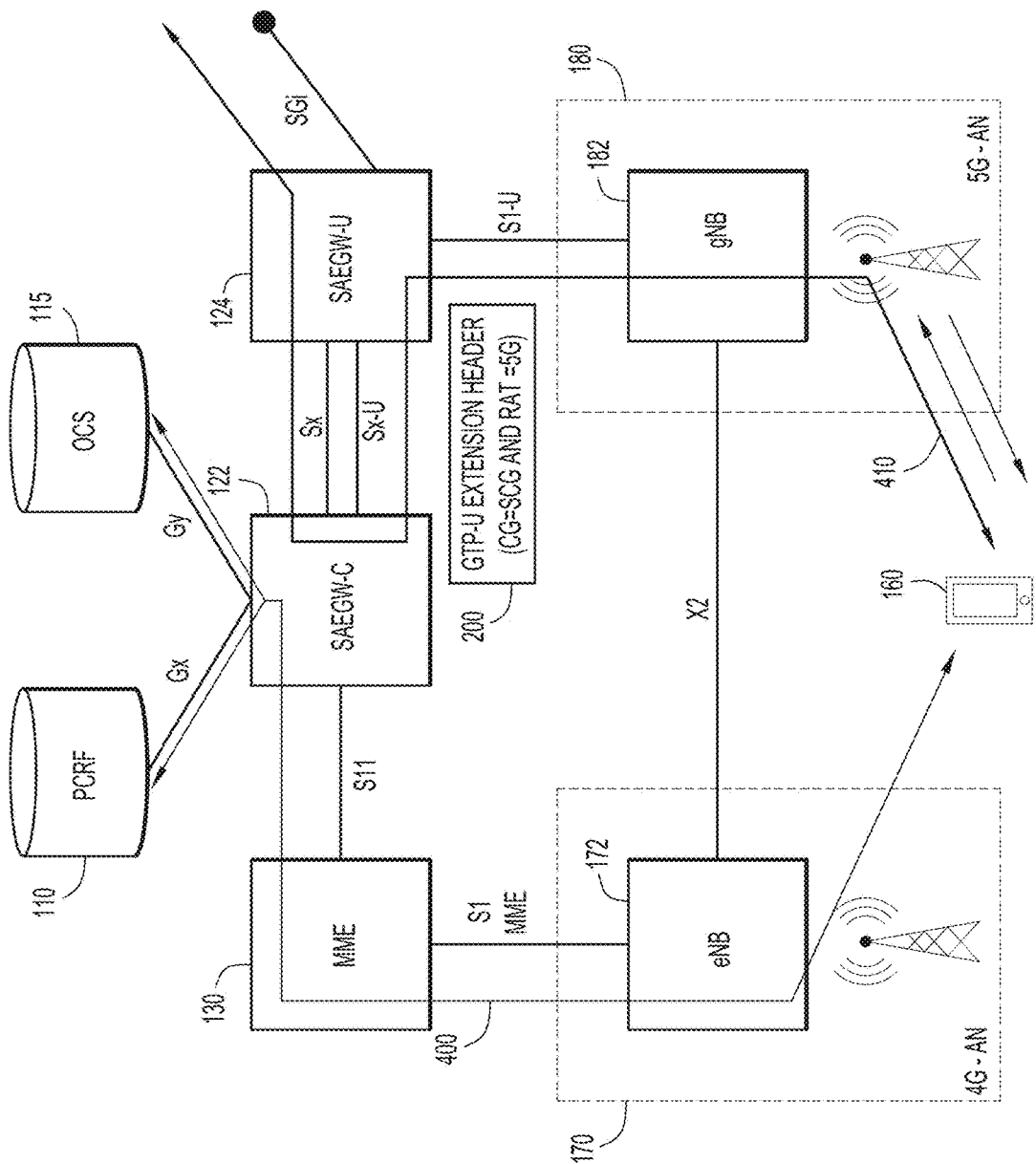
Figure 5:
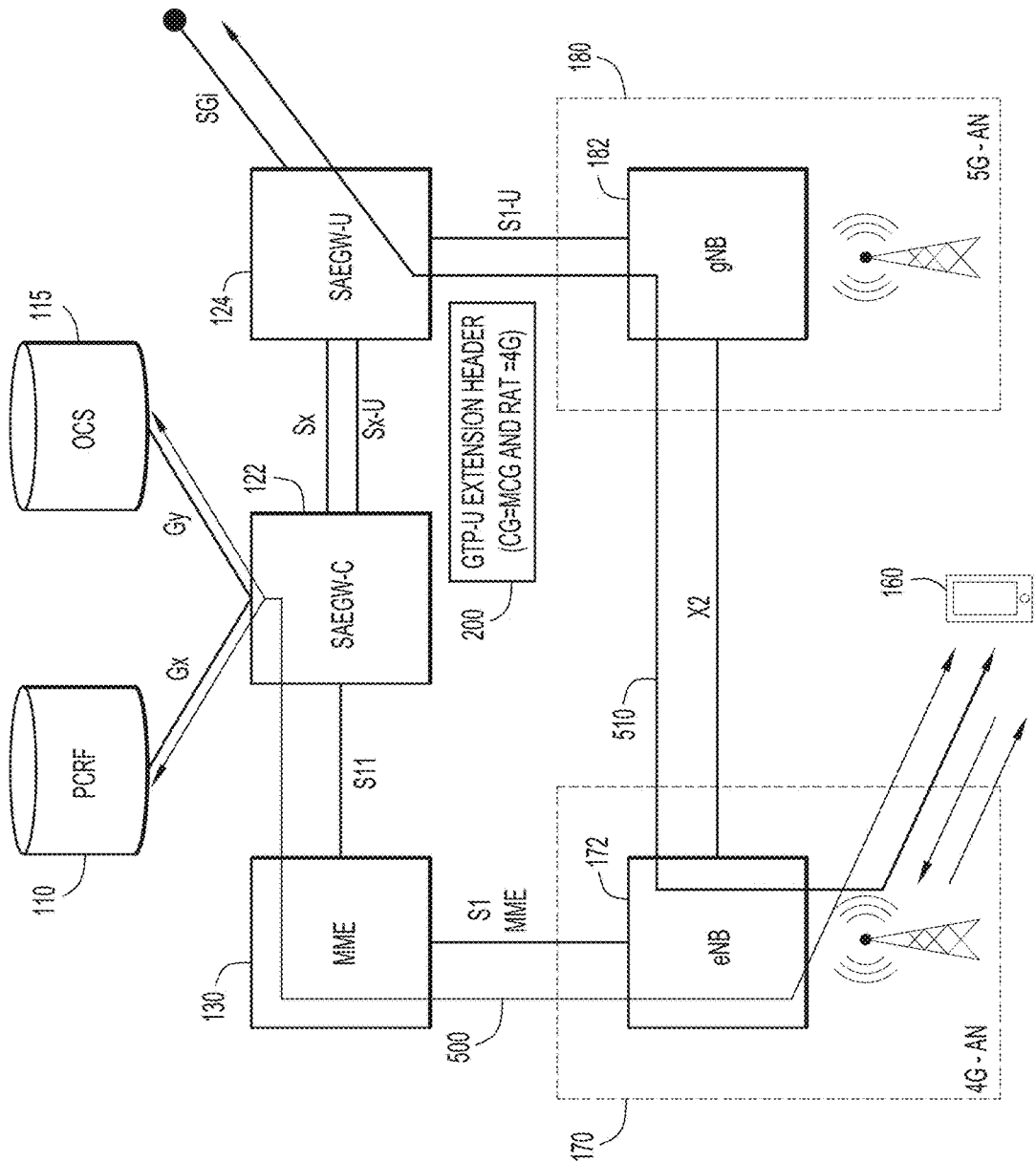

FIGS. 3-5 show three flow diagrams that are part of an operational flow according to the techniques presented herein.

Turning to FIG. 3, a flow diagram is shown for a first part of an operational flow. Here, the UE has attached to the 4G AN. FIG. 3 is similar to FIG. 1 except that the SAEGW 120 is split into a control plane part, referred to as SAEGW-C 122 and a user plane part, referred to as SAEGW-U 124. The control plane signaling is connected through the eNB 172 (Master Cell Group or MCG) of the 4G AN 170 as the UE 160 is being served by the eNB 172 at this time. The control plane signaling is shown at reference numeral 300 via the eNB 172, MME 130, SAEGW-C 122, PCRF 110 and OCS 115.

The user/data plane flow is shown at 310 between the UE 160, via the eNB 172, SAEGW-U 124 and SAEGW-C 122. The AN components (e.g., eNB/gNB or virtualized RAN components thereof) add the GTP-U extension header 200 to the first data packet that would be relayed to the SAEGW-C 122 for further processing and triggering Gx and Gy Requests to the PCRF 110 and OCS 115, respectively. As shown in FIG. 3, the GTP-U extension header 200 has the cell group (CG) set for MCG and the RAT set for 4G. In addition, the split bearer flag in the GTP-U extension header 200 is set to '0'. As a result, when the SAEGW-C 122 receives the first packet of user traffic associated with the UE 160, the SAEGW-C 122 does not act on this packet as there is no change in the RAT. Instead, the SAEGW-C just directs the packet to the SAEGW-U 124 for further processing, as shown at 320.

FIG. 4 shows a flow diagram for a second part of the operational flow. The UE 160 has moved to the 5G AN 180 and is now connected to the gNB 182. In the 5G NSA Option-3X architecture, the eNB 172, called the MeNB, is still used for the S1-MME signaling. The control plane signaling is shown at reference numeral 400 via the eNB 172, MME 130, SAEGW-C 122, PCRF 110 and OCS 115.

In the user/data plane as shown at 410, the vRAN adds the GTP-U extension header 200 to the first data packet that would be relayed to the SAEGW-C 122 for further processing and triggering Gx and Gy requests. The GTP-U extension header 200 now is configured with the CG set for the secondary group (SCG) and the RAT set for 5G. The split bearer flag is still set to '0'. The SAEGW-C 122 detects that there is a RAT change and triggers the Gx and Gy to the PCRF 110 and OCS 115, respectively, so that Quota and Policy rules are applied for the traffic for the UE 160 now based on its use of the 5G AN 180 instead of the 4G AN 170.

Reference is now made to FIG. 5. FIG. 5 shows a flow diagram for a third part of the operational flow. The UE 160 has moved back to the 4G AN 170. For example, the UE 160 has moved back from 5G to 4G coverage due to unavailability of NR-RLC. However, as shown at 500, the control plane signaling anchor still remains with eNB 172 (Master eNB) only and the PDCP (S1-U) termination remains with the gNB 182 (Secondary gNB).

In the user/data plane, however, as shown at 510, the RAN network element (physical or virtual) adds the GTP-U extension header 200 to the first data packet that would be relayed to the SAEGW-C 122 for further processing and triggering Gx and Gy Requests. The GTP-U extension header 200 has the CG set to MCG and the RAT set to 4G (a RAT change), and the split bearer flag set to '1'. In this scenario, since the user packet is served by the LTE/e-UTRAN RLC, the PDCP/S1-U termination was with the gNB 182 (user packets are sent from the gNB 182 to the eNB 172 via the X2 interface, and then further to UE (in both uplink and downlink directions) using the LTE/E-UTRAN RLC via the eNB 172. The SAEGW-C 122 detects that there is a RAT change (E-UTRAN in this case) and triggers the Gx and Gy procedures. The PDCP termination would still remain at gNB 182. The gNB 182 needs to know that the split bearer scenario has occurred, and the gNB 182 indi-cates it through the split bearer bit as well as the CG field and RAT field set to MCG and 4G, respectively, in the GTP-U extension header 200. The gNB 182 does this on GTP-U packets sent over the S1-U interface. The gNB 182 learns about this when the NR-RLC connectivity is lost and the X2-U interface is used between the gNB 182 and eNB 172. This is the only scenario in which the X2-U interface would be used and hence the gNB 182 can use this as a means for in-bang signaling about this split bearer indicator.

There are conditions in which the subscriber could be changing the RAT between LTE and NR. In such cases there could be a temporary state where the PDCP and RLC anchor points are different. For example, the S1-U interface is used by the gNB 182 while the UE 160 is in LTE coverage and the X2 interface is used for a data plane between the eNB 172 and the gNB 182.

The split bearer flag is enabled under such conditions, i.e., bit 7 in the GTP-U extension header 200, as shown in FIG. 2B, is enabled. Once this condition is resolved to a single RAT and cell group, bit 7 in the GTP-U extension header 200 is disabled.

The SAEGW-C 122 can identify this flag and can set the RAT type along the Diameter interfaces either based on a static or dynamic configuration. A dynamic configuration could be based on clustering algorithms to classify the dominating RAT type during a split bearer scenario of DC NR Option-3X. Specifically, there is a possibility that S1-U or PDCP termination is at gNB 182 and for user-data transmission at the access side, it could use both the 5G NR RLC and also the 4G/EUTRAN RLC (some portion of data could split on both access networks to meet the bandwidth requirements). In such a case a dynamic configuration approach may be useful to appropriately signal the dominating RAT type to the packet core in order to apply the appropriate policy and charging criteria for the dominating RAT type. This is one of the possibilities within 5G NSA Option-3X architecture.

Figure 6:
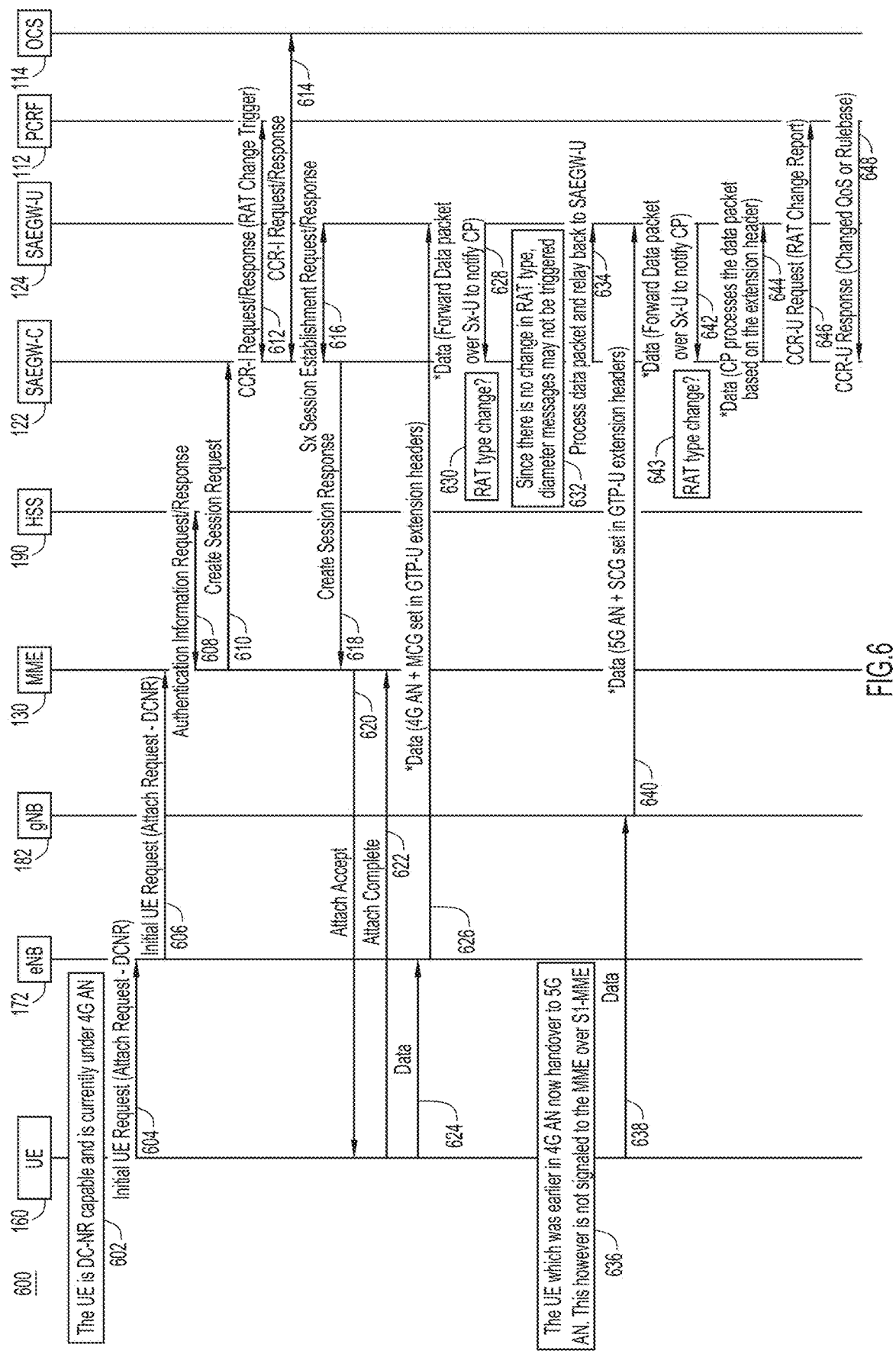
FIG. 6 is a detailed call flow diagram depicting operations for access network change reporting, according to an example embodiment.

FIG. 6 illustrates a detailed call flow 600 according to an example embodiment. The call flow 600 includes interactions with a Home Subscriber Server (HSS) 190, not shown in previous figures. As shown at 602, the UE 160 is DCNR capable and is connecting to the LTE radio of the eNB 172. At 604, the UE 160 sends a Non-Access Stratum (NAS) Attach Request with the DCNR bit set as per 3GPP TS 23.401. Next, at 606, the eNB 172 receives the Attach Request and sends it to the MME 130 as per 3GPP TS 23.401. At 608, the MME 130 and HSS 190 exchange an Authentication Information Request and Response. Next, at 610, the MME 130 sends to the SAEGW-C 122 a Create Session Request with RAT type set to eUTRAN, over the S11 interface, along with the Access Point Name (APN) and Quality of Service (QoS) parameters. At 612, the SAEGW-C 122 initiates a Credit Control Request-Initial (CCR-I) message towards the PCRF 112, which in turn may receive policy rules to be applied to the subscriber and specific to eUTRAN RAT type as a CCA-I. The PCRF 112 also arms the SAEGW-C 122 with the Event Trigger set to RAT_CHANGE as described in 3GPP TS 29.212. At 614, the SAEGW-C 122 initiates a CCR-I towards the OCS 114 if the Gy interface is enabled for quota management.

At 616, the Sx session is established between the SAEGW-C 122 and SAEGW-U 124. Configurations such as Packet Detection Rule (PDR), Forwarding Action Rule (FAR) and Usage Reporting Rule (URR) are applied to the SAEGW-U 124. After the Sx session is established, the SAEGW-C 122 sends a Create Session Response to the MME 130, at 618. The MME 130 sends the Attach Accept to the UE 160 as a response with the Global Unique Temporary Identifier (GUTI) and allocated Internet Protocol (IP) address, at 620. The UE 160, at 622, sends an Attach Complete as an acknowledgement to the Attach Accept.

After the Attach Complete is sent to the MME 130, the UE 160, if allocated with an IPv6 address, begins with the Router Solicitation and Router Advertisement procedures with appropriate maximum transmit unit (MTU) values to be used in the data path. Up to this point the call flow follows the 3GPP TS 23.401 standards.

At 624, the UE 160 sends data packets to the eNB 172. At 626, the eNB 172 encapsulates the IP packets into GTP-U packets along with the GTP-U Extension Header 200 referred to above in connection with FIGS. 2A and 2B. The Next Extension Header fields are set to the new value '0x30' i.e., AN Change Notification. The Extension Header 200 will have Cell Group set to '0001', that of Master Cell group and RAT Type set to '0001' i.e., an indication of 4G as the access network serving the user-data session. The GTP-U Extension Header 200 is sent on demand and in-band along the data plane i.e., the eNB 172 (or other applicable RAN or vRAN component) includes extension headers only if there is a RAT or Cell group change.

Though not specifically shown in FIG. 6, the SAEGW-U 124 sends an Acknowledgement to the eNB 172, again encoded in the GTP-U packet as an Extension Header in the downlink GTP-U packet, by setting bits 0-6 as '1'.

At 628, the SAEGW-U 124, with GTP-U Extension Header encoded as described herein, forwards the packet to the SAEGW-C 122 over the Sx-U interface to notify the control plane (SAEGW-C 122) about the RAT type. At 630, the SAEGW-C 122 determines whether there is a change in the RAT type and if so, appropriate Gx procedures are initiated to fetch RAT specific policies. In this case, the SAEGW-C 122 determines that there is no change in the RAT as shown at 632, and hence processes the GTP-U Extension Header, and at 634, sends the data packet back to the SAEGW-U along the Sx-U to be forwarded further along the Gi path.

Until this point the UE 160 was in a 4G RAT. However, the UE 160, as shown at 636, the UE 160 now moves to a NR radio, gNB 182, also called a Secondary gNodeB (SgNB) which is associated as a Secondary Cell group to the eNB 172 (called the MeNB). The UE 160 now sends data packets to the gNB 182, as shown at 638. When the UE 160 moves to gNB 182 (5G coverage in the EN-DC), there will be a secondary node addition procedure in the RLC and an Enhanced Radio Access Bearer (E-RAB) modification indication procedure triggered by the eNB. At this point, the S1-U PDCP termination also would be changed to the gNB 182 and the gNB 182 starts serving the data session. In the user plane (and without using the GTP-U extension header presented herein), this would just be a change on the S1-U PDCP terminating point from one node to another (it is simply a GTP Tunnel Endpoint Identifier (TEID) and IP address information change), but that would not indicate if it the change was from eNB to gNB or vice-versa). Thus, the next extension header in the GTP-U as described herein is provided to carry exact RAT information to mobile packet core.

At 640, the gNB 182, or some appropriate vRAN component in a vRAN implementation, encapsulates IP packets within GTP-U packets with Next Extension Header. The Next Extension Header fields are set to the new value '0x30' i.e., indicating the AN Change Notification. The GTP-U Extension Header shown in FIGS. 2A and 2B will have Cell Group set to '0010' for a Secondary Cell Group and RAT Type set to '0010' for 5G-NR. The gNB 182 sends the GTP-U Extension Header 200 on demand and in-band along the data plane. That is, the gNB 182 includes extension headers only if there is a RAT or Cell Group change. The SAEGW-U 124 sends to the gNB 182 encoded in GTP-U extension header setting bits 0-6 as '1' to acknowledge the information from the gNB 182.

At 642, the SAEGW-U 124 forwards the packet, with extension headers encoded in the GTP-U packet to the SAEGW-C 122 over the Sx-U interface to notify the control plane about the RAT type.

At 643, the SAEGW-C 122 determines whether there is a change in the RAT type and if so, appropriate Gx procedures are initiated to fetch RAT specific policies. At 644, after the SAEGW-C 122 processes the GTP-U packet, the GTP-U packet is then sent back to the SAEGW-U 124 along the Sx-U interface to be forwarded further along the Gi path. In this case, as there is a change in the RAT type, as determined by the SAEGW-C 122 at 643, then at 646, the SAEGW-C initiates a Credit Control Request-Update (CCR-U) towards the PCRF 112 with Event Trigger set to RAT_CHANGE(2) as described in 3GPP TS 29.212. At 648, the PCRF 112 responds with the RAT specific policies back to the SAEGW-C 122. The SAEGW-C 122 then modifies the Sx session with specific FAR, PDR, URR and Quality of Service Enforcement Rule (QER).

Figure 7:
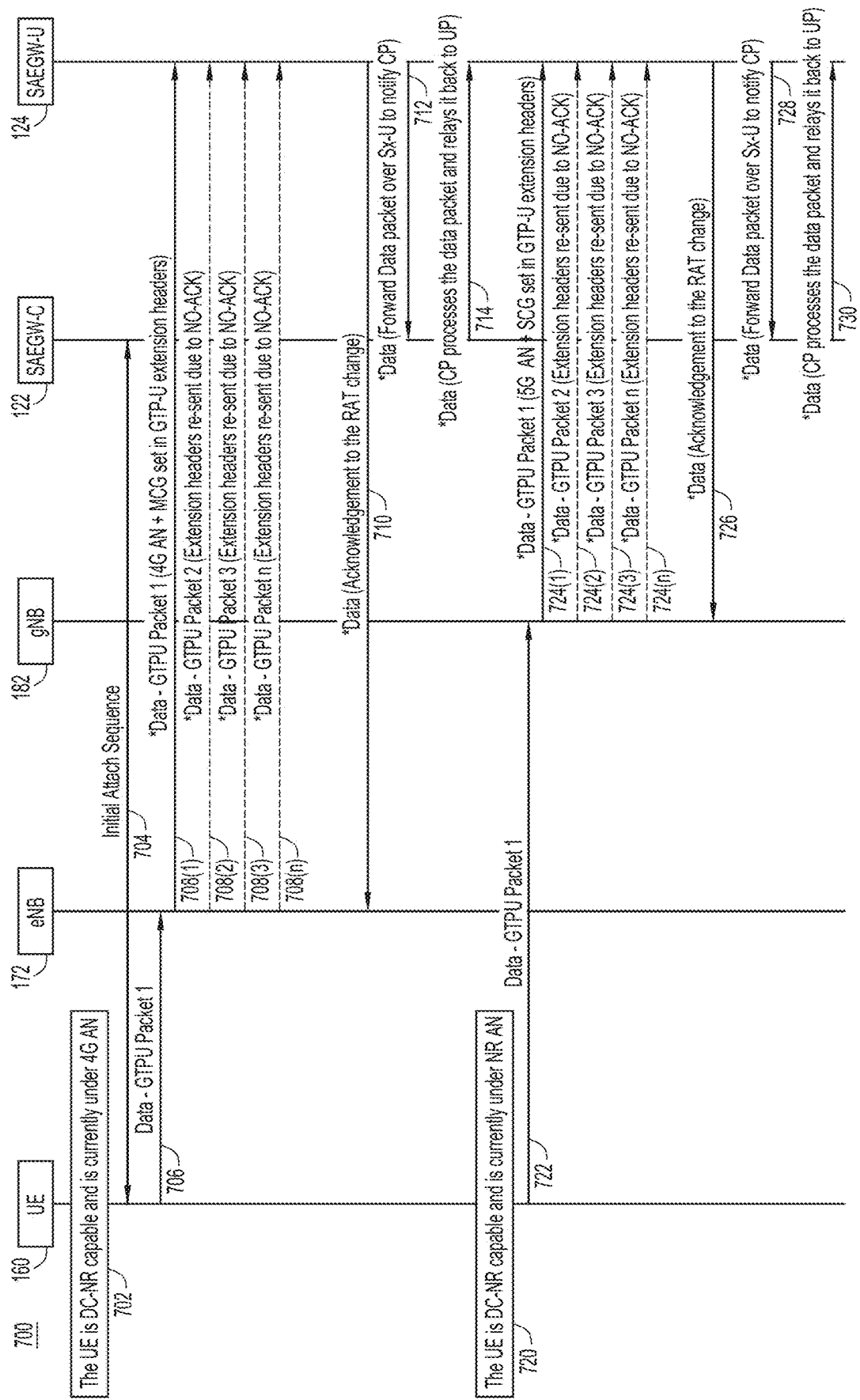
FIG. 7 is a detailed call flow diagram depicting operations that involve the access network change notification and acknowledgment signaled in-band, according to an example embodiment.

Reference is now made to FIG. 7. FIG. 7 illustrates a detailed call flow for the situation in which AN change notification reliability is indicated, along with acknowledgment by the user plane for in-band signaled AN information. As shown at 702, a DC NR capable UE 160 is under the 4G coverage. At 704, the UE 160 successfully registers to the network through an Attach sequence as described in 3GPP TS 23.401. After the Attach Complete is sent to the MME (not shown in FIG. 7), the UE 160 is allocated with an IPv6 address and begins the Router Solicitation and Router Advertisement procedures with appropriate MTU values to be used in the data path. The data packets are now transmitted from and to the UE, at 706, via eNB 172.

At 708(1), the eNB 172 encapsulates IP data packets the GTP-U Next Extension Header field enabled. The GTP-U Extension Header field is encoded to correctly reflect the RAT Type and Cell Group serving the UE 160. The GTP-U Extension Header is sent on-demand and in-band to the data plane.

The AN change notification due to RAT or Cell Group change are actioned only by the core and nothing is sent to the RAN in return. However, to maintain the consistency in states and reliability of notifications between access networks and core network, an acknowledgement (ACK) is expected from the core network component i.e., the SAEGW-U 124 towards the eNB 172 or gNB 182.

As shown at 708(1)-708(n), the eNB will continue to transmit the GTP-U packets with the Extension Headers until it receives an acknowledgment from the SAEGW-U 124. The re-transmission of extension headers in the GTP-U packets means the encoding of extension headers are repeated in every new user data packet. The packets GTP-U themselves are not retransmitted due to lack of acknowledgement. As shown at 710, the SAEGW-U 124 eventually sends an ACK to the eNB 172. The ACK from the SAEGW-U 124 to the eNB 172 stops further encoding of extension headers until the next RAT or Cell Group change.

At 712, the SAEGW-U 124 forwards the GTP-U packet to the SAEGW-C, if it was not already done, to initiate appropriate Gx signaling procedures. In this case since there was no specific RAT change, Gx procedures for RAT changes may not be initiated. At 714, the SAEGW-C 122 processes the GTP-U packet and sends it sent back to the SAEGW-U 124 to be forwarded along the SGi path.

As shown at 720, the UE 160 moves from 4G to 5G NR coverage. The radio and PDCP are served by the gNB 182, as explained above in connection with FIG. 5. The UE 160 sends a data packet to the gNB 182 when it moves to 5G NR coverage.

The gNB 182 encodes the GTP-U packet is with extension headers with RAT Type as 5G-NR and Cell Group as a Secondary Cell Group (SCG), and sends the encoded GTP-U packet to the SAEGW-U, as shown at 724(1). The gNB 182 retransmits the GTP-U extension header until an ACK is received from the SAEGW-U, as shown at 724(2)-724(n). Eventually, as shown at 726, the SAEGW-U 124 sends an ACK towards the gNB 182 for the AN change notification.

At 728, the SAEGW-U forwards the GTP-U packet to the SAEGW-C 122, if it was not already done, to initiate appropriate Gx signaling procedures. In this case, since there is a RAT change, Gx procedures for RAT changes are initiated with Event Trigger set to RAT_CHANGE (2) requesting RAT specific policies, similar to operations 646 and 648 shown in FIG. 6. After the SAEGW-C 122 processes the GTP-U packet, the SAEGW-C 122 sends it back to the SAEGW-U 124 to be forwarded along the SGi path.

Figure 8:
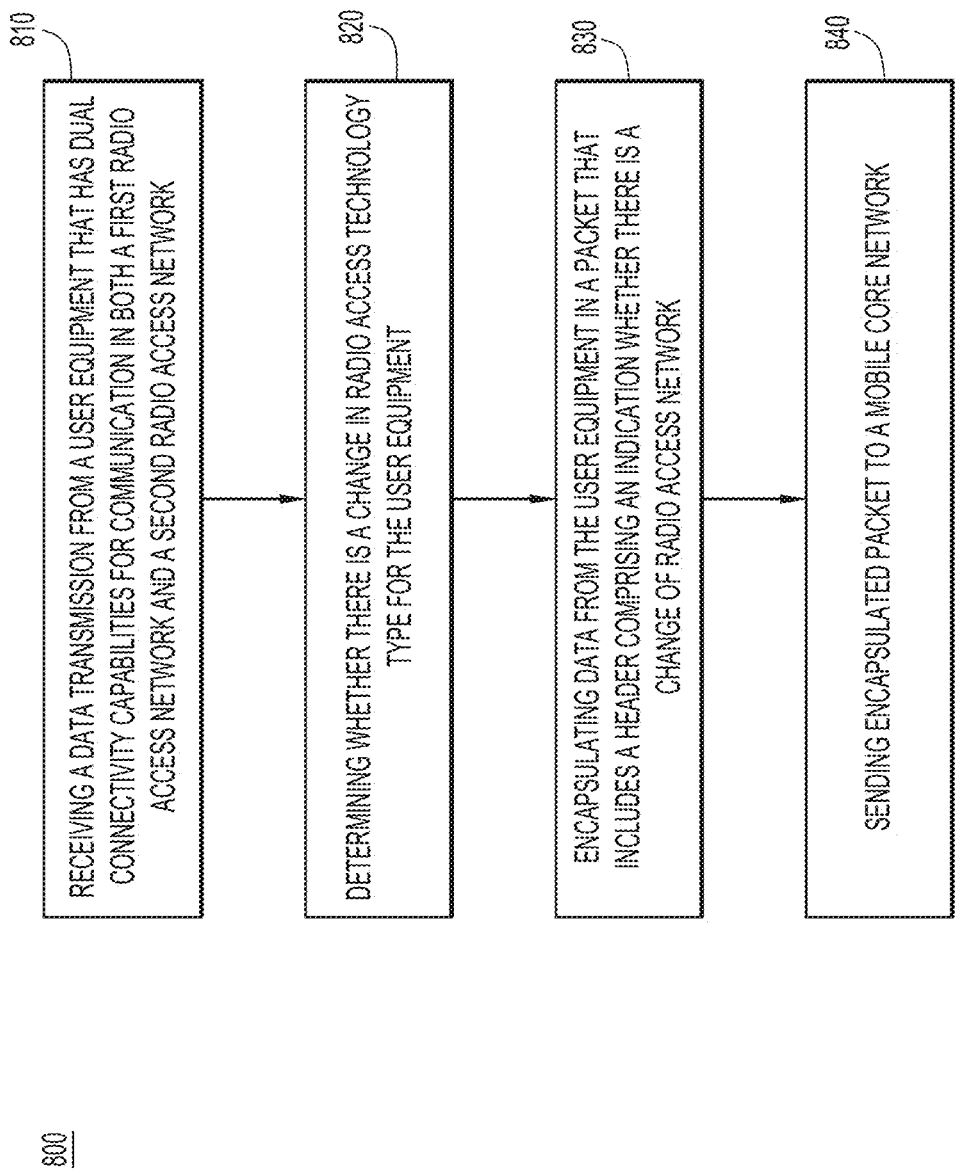
FIG. 8 is a flow chart depicting operations performed by a radio access network element, according to an example embodiment.

Reference is now made to FIG. 8, for description of a method 800 performed by a radio access network element (e.g., eNB, gNB or some vRAN element) in a radio access network, such as the second radio access network (arbitrarily chosen for purposes of this description. The method is performed by the radio access network element in the context of a communication system that includes at least a first radio access network of a first radio access technology type and a second radio access network of a second radio access technology type. At 810, the method includes the radio access network element in the second radio access network receiving a data transmission from a user equipment that has dual connectivity capabilities for communication in both the first radio access network and the second radio access network. At 820, the method includes the radio access network element determining whether there is a change in radio access technology type for the user equipment indicating that the user equipment has handed over from the first radio access network to the second radio access network. At 830, the method includes the radio access network element, based on the determining operation 820, encapsulating data from the user equipment in a packet that includes a header comprising an indication whether there is a change of radio access network, to form an encapsulated packet. At 840, the method includes radio access network element sending the encapsulated packet to a mobile core network.

In one embodiment, the operation 830 of encapsulating may comprise setting values in the header to indicate radio access technology type being either the first radio access technology type or the second radio access technology type, and a cell group being either a master cell group or a secondary cell group. Furthermore, in one form, when it is determined that the user equipment has changed radio access technology type to the second radio access network from the first radio access network, the encapsulating operation 830 may include setting a value in the header to indicate the change of radio access network, setting a value in the header to indicate the radio access technology type is the second radio access technology type, and setting a value in the header to indicate the cell group is the secondary cell group.

As described herein, in one form, the first radio access technology type is $4^{th}$ Generation (4G)/Long Term Evolution (LTE) and the second radio access technology type is $5^{th}$ Generation (5G) New Radio (NR).

The method 800 may further include, in one form: at a radio access network element in the first radio access network: receiving a data transmission from the user equipment; determining that the user equipment has handed over from the second radio access network back to the second radio access network; and encapsulating data from the user equipment in a packet that includes a header comprising an indication that there is a change of radio access network, and an indication of the radio access technology type being the first radio access technology type, an indication that the cell group is the master cell group, and a flag to indicate a split bearer scenario in which Packet Data Convergence Protocol (PDCP) termination is at the radio access network element in the second radio access network and data packets for the user equipment are sent from the radio access network element in the second radio access network to the radio access network element in the first radio access network for communication to the user equipment.

As described above in connection with FIGS. 2A and 2B, the header may be an extension header of a General Packet Radio Service (GPRS)-User Plane (GTP-U) protocol packet, and wherein the value in the header to indicate the change of radio access network is a particular value in a GTP-U next extension header field. The extension header may include a content field that comprises one or more bits to represent the value for the radio access technology type, one or more bits to represent the value for the cell group, and a bit for the flag to indicate the split bearer scenario. In one form, wherein when it is determined that the user equipment has not changed radio access network, the encapsulating operation 830 may involve encapsulating the packet so as not to include the extension header when forming the encapsulated packet.

As described above in connection with FIG. 7, the method 800 may further include repeating sending to the mobile core network encapsulated packets with the header comprising the indication of the change of radio access network until an acknowledgment is received from the mobile core network to the change in radio access network.

Figure 9:
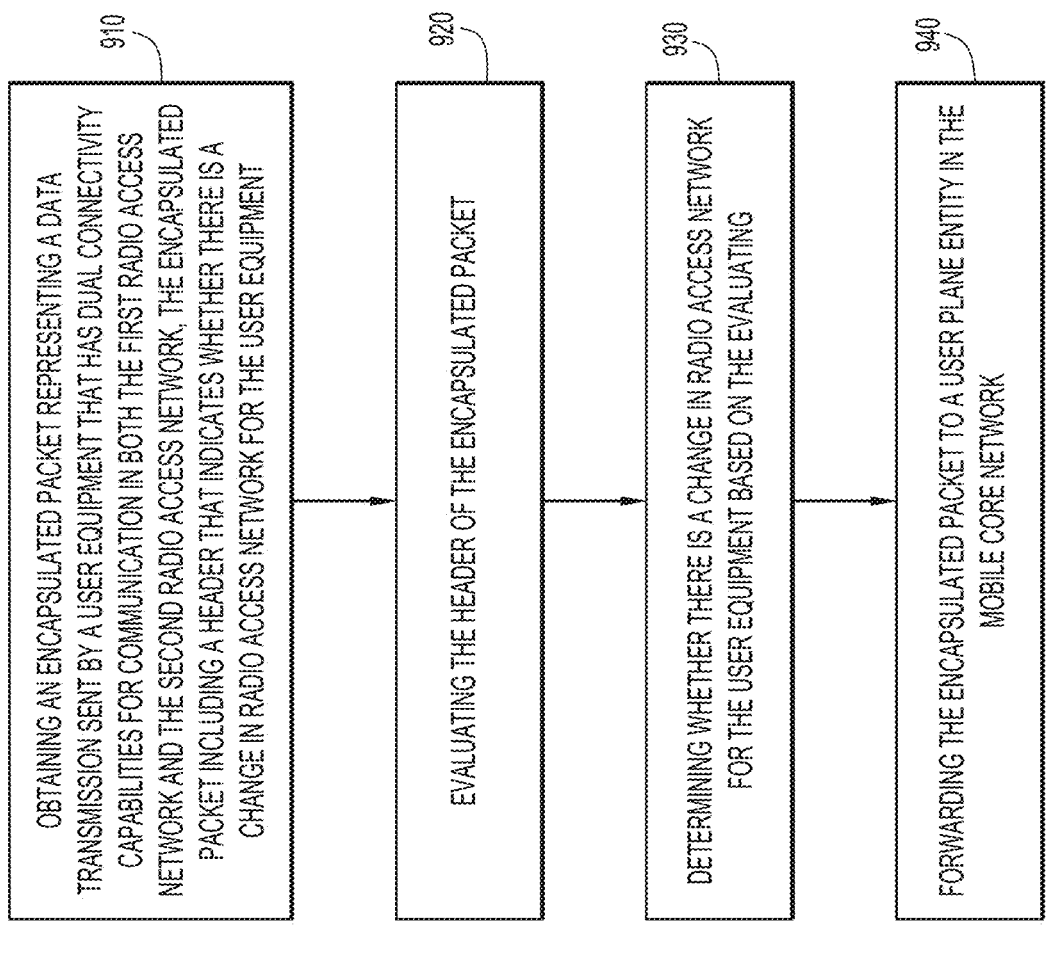
FIG. 9 is a flow chart depicting operations performed by a control plane gateway element in a mobile core network, according to an example embodiment.

Reference is now made to FIG. 9 for a description of a method 900 performed by a gateway element (e.g., SAEGW-C 122 or SAEGW-U 124 referred to in the figures above) in a mobile core network. The mobile core network is in communication with at least a first radio access network of a first radio access technology type and a second radio access network of a second radio access technology type. At 910, the method includes the gateway element obtaining an encapsulated packet representing a data transmission sent by a user equipment that has dual connectivity capabilities for communication in both the first radio access network and the second radio access network. The encapsulated packet includes a header that indicates whether there is a change in radio access network for the user equipment.

At 920, the method includes the gateway element evaluating the header of the encapsulated packet.

At 930, the method includes the gateway element determining whether there is a change in radio access network for the user equipment based on the evaluating operation 920.

At 940, the method includes the gateway element forwarding the encapsulated packet to a user plane entity in the mobile core network.

In one form, the header indicates the user equipment is connected to the first radio access network using the first radio access technology type or is connected to the second radio access network using the second radio access technology type, and a cell group is either a master cell group or a secondary cell group.

Further, when it is determined that there is a change in radio access network, the method 900 may further include: sending to a policy and charging rules function a credit control request update based on change in radio access technology type to either the first radio access technology type or the second radio access technology type, as indicated in the header; and receiving from the policy and charging rules function a credit control request update response that specifies one or more policies, for the user equipment, for either the first radio access technology type or the second radio access technology type.

As described above in connection with FIGS. 2A and 2B, the header may be an extension header of a General Packet Radio Service (GPRS)-User Plane (GTP-U) protocol packet, and wherein a value in the header to indicate the change of radio access network is a particular value in a GTP-U next extension header field. The extension header may include a content field that comprises one or more bits to represent the value for the radio access technology type, one or more bits to represent the value for a cell group as either a master cell group or a secondary cell group, and a bit for a flag to indicate a split bearer scenario.

In summary, techniques are provided to inform a mobile packet core of the (AN/RAT) change from LTE to NR and vice-versa with the use of in-band signaling along the User-Plane and hence reduce S1-AP signaling between an eNB and MME. A new GTP-U extension header content (e.g., of 1 byte) is provided to signal the AN/RAT information, Cell Group changes and acknowledging the same (mobile core network user plane to MeNB or SgNB) is also provided, implementing the reliability of notifications for these procedures. Further still, a method is provided to handle AN change notification for split bearer scenarios (FIG. 5) by introducing a split bearer flag for the mobile packet core to be notified of the predominant access type serving the subscriber data session in 5G NSA Option-3, Option-3A and Option-3X, so that static or dynamic configurations can be applied by the mobile core network accordingly.

Figure 10:
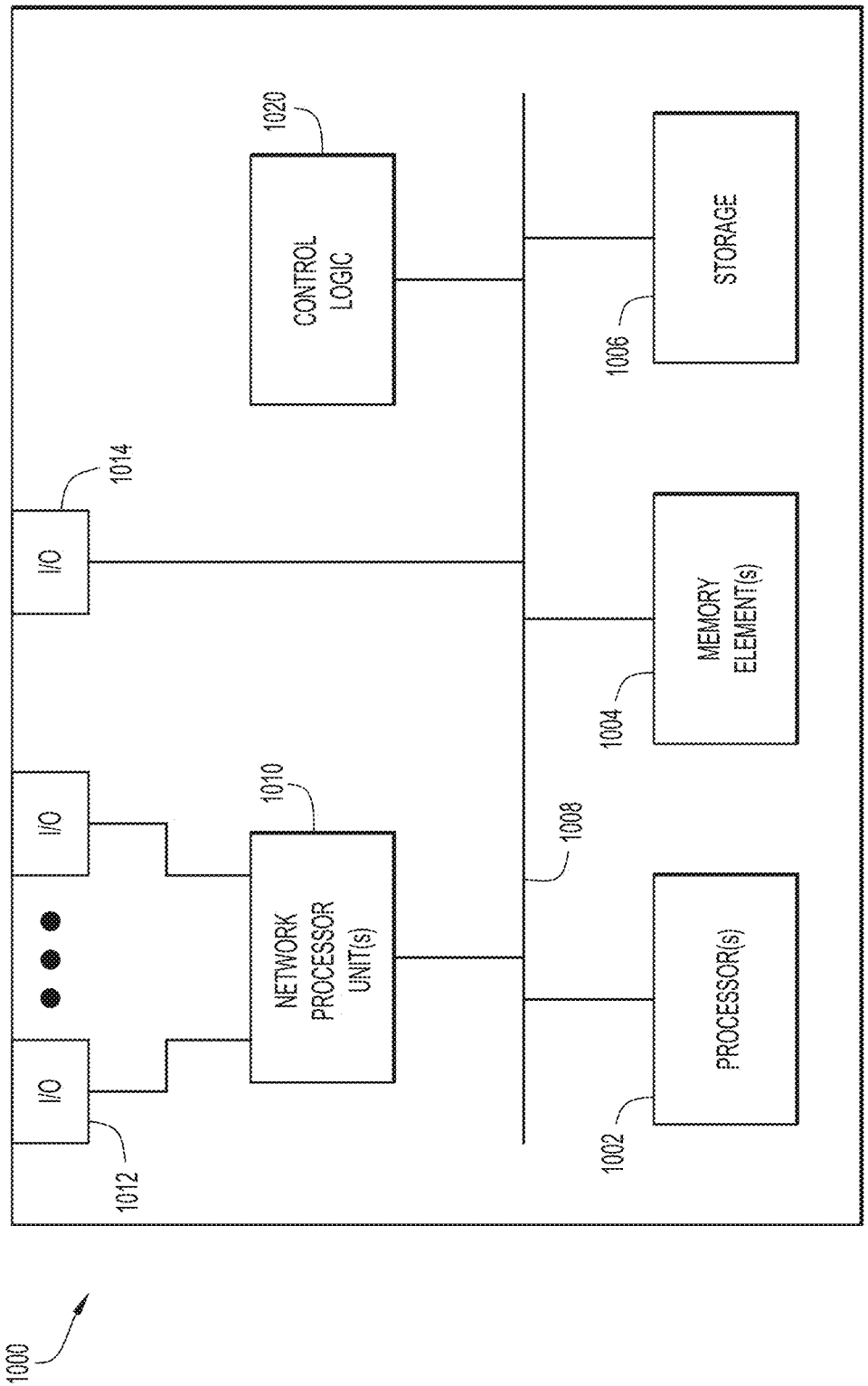
FIG. 10 is a hardware block diagram of a computing device that may be configured to perform the techniques presented herein, according to an example embodiment.

Referring to FIG. 10, a hardware block diagram is provided of a computing device 1000 that may perform functions associated with operations described herein in connection with the FIGS. 1-9. In various embodiments, a computing device, such as computing device 1000 or any combination of computing devices 1000, may be configured as any entity/entities as discussed for the techniques depicted in connection with FIGS. 1-9 in order to perform operations of the various techniques discussed herein.

In at least one embodiment, the computing device 1000 may include one or more processor(s) 1002, one or more memory element(s) 1004, storage 1006, a bus 1008, one or more network processor unit(s) 1010 interconnected with one or more network input/output (I/O) interface(s) 1012, one or more I/O interface(s) 1014, and control logic 1020. In various embodiments, instructions associated with logic for computing device 1000 can overlap in any manner and are not limited to the specific allocation of instructions and/or operations described herein.

In at least one embodiment, processor(s) 1002 is/are at least one hardware processor configured to execute various tasks, operations and/or functions for computing device 1000 as described herein according to software and/or instructions configured for computing device 1000. Processor(s) 1002 (e.g., a hardware processor) can execute any type of instructions associated with data to achieve the operations detailed herein. In one example, processor(s) 1002 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1004 and/or storage 1006 is/are configured to store data, information, software, and/or instructions associated with computing device 1000, and/or logic configured for memory element(s) 1004 and/or storage 1006. For example, any logic described herein (e.g., control logic 1020) can, in various embodiments, be stored for computing device 1000 using any combination of memory element(s) 1004 and/or storage 1006. Note that in some embodiments, storage 1006 can be consolidated with memory element(s) 1004 (or vice versa), or can overlap/exist in any other suitable manner.

In at least one embodiment, bus 1008 can be configured as an interface that enables one or more elements of computing device 1000 to communicate in order to exchange information and/or data. Bus 1008 can be implemented with any architecture designed for passing control, data and/or information between processors, memory elements/storage, peripheral devices, and/or any other hardware and/or software components that may be configured for computing device 1000. In at least one embodiment, bus 1008 may be implemented as a fast kernel-hosted interconnect, potentially using shared memory between processes (e.g., logic), which can enable efficient communication paths between the processes.

In various embodiments, network processor unit(s) 1010 may enable communication between computing device 1000 and other systems, entities, etc., via network I/O interface(s) 1012 to facilitate operations discussed for various embodiments described herein. In various embodiments, network processor unit(s) 1010 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1000 and other systems, entities, etc. to facilitate operations for various embodiments described herein. In various embodiments, network I/O interface(s) 1012 can be configured as one or more Ethernet port(s), Fibre Channel ports, and/or any other I/O port(s) now known or hereafter developed. Thus, the network processor unit(s) 1010 and/or network I/O interface(s) 1012 may include suitable interfaces for receiving, transmitting, and/or otherwise communicating data and/or information in a network environment.

I/O interface(s) 1014 allow for input and output of data and/or information with other entities that may be connected to computer device 1000. For example, I/O interface(s) 1014 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1020 can include instructions that, when executed, cause processor(s) 1002 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1020) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

[ow] In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1004 and/or storage 1006 can store data, software, code, instructions (e.g., processor instructions), logic, parameters, combinations thereof, and/or the like used for operations described herein. This includes memory element(s) 1004 and/or storage 1006 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

In summary, in one form, a method is provided for use in a communication system that includes at least a first radio access network of a first radio access technology type and a second radio access network of a second radio access technology type, the method performed at a radio access network element of the second radio access network, comprising: receiving a data transmission from a user equipment that has dual connectivity capabilities for communication in both the first radio access network and the second radio access network; determining whether there is a change in radio access technology type for the user equipment indicating that the user equipment has handed over from the first radio access network to the second radio access network; based on the determining, encapsulating data from the user equipment in a packet that includes a header comprising an indication whether there is a change of radio access network, to form an encapsulated packet; and sending the encapsulated packet to a mobile core network.

In another form, an apparatus is provided comprising: a network interface configured to enable network communications in a communication system that includes at least a first radio access network of a first radio access technology type and a second radio access network of a second radio access technology type; a processor coupled to the network interface, the processor configured to perform operations including: obtaining a data transmission from a user equipment that has dual connectivity capabilities for communication in both the first radio access network and the second radio access network; determining whether there is a change in radio access technology type for the user equipment indicating that the user equipment has handed over from the first radio access network to the second radio access network; based on the determining, encapsulating data from the user equipment in a packet that includes a header comprising an indication whether there is a change of radio access network, to form an encapsulated packet; and sending the encapsulated packet, via the network interface, to a mobile core network.

In still another form, one or more non-transitory computer readable storage media are provided, encoded with instructions that, when executed by at least one processor, cause the at least one processor to perform operations including: receiving a data transmission from a user equipment that has dual connectivity capabilities for communication in both a first radio access network and a second radio access network; determining whether there is a change in radio access technology type for the user equipment indicating that the user equipment has handed over from the first radio access network to the second radio access network; based on the determining, encapsulating data from the user equipment in a packet that includes a header comprising an indication whether there is a change of radio access network, to form an encapsulated packet; and sending the encapsulated packet to a mobile core network.

In still another form, a method is provided that is performed in a mobile core network that is in communication with at least a first radio access network of a first radio access technology type and a second radio access network of a second radio access technology type, the method performed at a gateway element in the mobile core network, comprising: obtaining an encapsulated packet representing a data transmission sent by a user equipment that has dual connectivity capabilities for communication in both the first radio access network and the second radio access network, the encapsulated packet including a header that indicates whether there is a change in radio access network for the user equipment; evaluating the header of the encapsulated packet; determining whether there is a change in radio access network for the user equipment based on the evaluating; and forwarding the encapsulated packet to a user plane entity in the mobile core network.

In another form, an apparatus is provided comprising: a network interface configured to enable network communications in a communication system that includes at least a first radio access network of a first radio access technology type and a second radio access network of a second radio access technology type; and a processor coupled to the network interface, the processor configured to perform operations including: obtaining an encapsulated packet representing a data transmission sent by a user equipment that has dual connectivity capabilities for communication in both the first radio access network and the second radio access network, the encapsulated packet including a header that indicates whether there is a change in radio access network for the user equipment; evaluating the header of the encapsulated packet; determining whether there is a change in radio access network for the user equipment based on the evaluating; and forwarding the encapsulated packet to a user plane entity in the mobile core network.

Further still, one or more non-transitory computer readable storage media are provided, encoded with instructions that, when executed by at least one processor, cause the at least one processor to perform operations including: obtaining an encapsulated packet representing a data transmission sent by a user equipment that has dual connectivity capabilities for communication in both the first radio access network and the second radio access network, the encapsulated packet including a header that indicates whether there is a change in radio access network for the user equipment; evaluating the header of the encapsulated packet; determining whether there is a change in radio access network for the user equipment based on the evaluating; and forwarding the encapsulated packet to a user plane entity in the mobile core network.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. In a communication system that includes at least a first radio access network of a first radio access technology type and a second radio access network of a second radio access technology type, a method performed at a radio access network element of the second radio access network, comprising:
   receiving a data transmission from a user equipment that has dual connectivity capabilities for communication in both the first radio access network and the second radio access network;
   determining whether there is a change in radio access technology type for the user equipment indicating that the user equipment has handed over from the first radio access network to the second radio access network;
   in response to determining that the user equipment has changed radio access technology type, encapsulating data from the user equipment in a General Packet Radio Service (GPRS)-User Plane (GTP-U) protocol packet by providing an 8-bit extension header comprising a 4-bit indication to indicate to a mobile core network that the radio access technology type is changed to the second radio access technology type from the first radio access technology type, a 3-bit indication to indicate to the mobile core network that a cell group is changed to a secondary cell group from a master cell group, and a 1-bit flag to indicate to the mobile core network whether a split bearer scenario is enabled or disabled, to form an encapsulated GTP-U protocol packet; and
   sending the encapsulated GTP-U protocol packet to the mobile core network to inform the mobile core network that the user equipment has changed to the second radio access technology type.

2. The method of claim 1, when it is determined that the user equipment has changed radio access technology type to the second radio access technology type from the first radio access technology type, encapsulating comprises setting a value of the 4-bit indication to indicate the radio access technology type is changed to the second radio access technology type, and setting a value of the 3-bit indication to indicate the cell group is changed to the secondary cell group.

3. The method of claim 2, further comprising:
   at a radio access network element in the first radio access network:
   receiving a second data transmission from the user equipment;
   determining that there is a change in radio access technology type for the user equipment indicating that the user equipment has handed over from the second radio access network back to the first radio access network;
   encapsulating data from the user equipment in a second GTP-U protocol packet by providing an 8-bit extension header comprising 4-bit indication of the radio access technology type being changed to the first radio access technology type from the second radio access technology type, 3-bit indication that the cell group is changed to the master cell group from the secondary cell group, and a 1-bit flag to indicate that the split bearer scenario is enabled, in which Packet Data Convergence Protocol (PDCP) termination is at the radio access network element in the second radio access network and data packets for the user equipment are sent from the radio access network element in the second radio access network to the radio access network element in the first radio access network for communication to the user equipment; and
   sending the encapsulated second GTP-U protocol packet to the mobile core network to inform the mobile core network that the user equipment has changed to the first radio access technology type and that the split bearer scenario is enabled.

4. The method of claim 1, wherein the 8-bit extension header is identified via a particular value in a GTP-U next extension header field of the encapsulated GTP-U protocol packet.

5. The method of claim 1, wherein when it is determined that the user equipment has not changed radio access technology type, encapsulating comprises encapsulating the_GTP-U protocol packet so as not to include the 8-bit extension header when forming the encapsulated GTP-U protocol packet.

6. The method of claim 1, wherein the first radio access technology type is $4^{th}$ Generation (4G)/Long Term Evolution (LTE) and the second radio access technology type is $5^{th}$ Generation (5G) New Radio (NR).

7. The method of claim 1, further comprising:
repeating sending to the mobile core network encapsulated GTP-U protocol packets with the 8-bit extension header comprising the 4-bit indication to indicate to the mobile core network that the radio access technology type is changed to the second radio access technology type from the first radio access technology type, the 3-bit indication to indicate to the mobile core network that the cell group is changed to the secondary cell group from the master cell group, and the 1-bit flag to indicate to the mobile core network whether the split bearer scenario is enabled or disabled until an acknowledgment is received from the mobile core network to the change in radio access technology type.

8. The method of claim 3, wherein, when the 1-bit flag indicates that the split bearer scenario is enabled, the 1-bit flag triggers a gateway of the mobile core network to set the radio access technology type according to a dynamic configuration approach based on a clustering algorithm to classify a dominating radio access technology type during the split bearer scenario, and to signal the dominating radio access technology type to a policy and charging rules function (PCRF) of the mobile core network to apply appropriate policy and charging rules for the user equipment that are specific to the dominating radio access technology type being used during the split bearer scenario.

9. An apparatus comprising:
a network interface configured to enable network communications in a communication system that includes at least a first radio access network of a first radio access technology type and a second radio access network of a second radio access technology type; and
a processor coupled to the network interface, the processor configured to perform operations including:
obtaining a data transmission from a user equipment that has dual connectivity capabilities for communication in both the first radio access network and the second radio access network;
determining whether there is a change in radio access technology type for the user equipment indicating that the user equipment has handed over from the first radio access network to the second radio access network;
in response to determining that the user equipment has changed radio access technology type, encapsulating data from the user equipment in a General Packet Radio Service (GPRS)-User Plane (GTP-U) protocol packet by providing an 8-bit extension header comprising a 4-bit indication to indicate to a mobile core network that the radio access technology type is changed to the second radio access technology type from the first radio access technology type, 3-bit indication to indicate to the mobile core network that a cell group is changed to a secondary cell group from a master cell group, and a 1-bit flag to indicate to the mobile core network whether a split bearer scenario is enabled or disabled, to form an encapsulated GTP-U protocol packet; and
sending the encapsulated GTP-U protocol packet, via the network interface, to the mobile core network to inform the mobile core network that the user equipment has changed to the second radio access technology type.

10. The apparatus of claim 9, wherein when the processor determines that the user equipment has changed radio access technology type to the second radio access technology type from the first radio access technology type, the processor performs the encapsulating by setting a value of the 4-bit indication to indicate the radio access technology type is changed to the second radio access technology type, and setting a value of the 3-bit indication to indicate the cell group is changed to the secondary cell group.

11. The apparatus of claim 9, wherein when the processor determines that the user equipment has not changed radio access technology type, the processor performs the encapsulating so as not to include the_8-bit extension header when forming the encapsulated GTP-U protocol packet.

12. The apparatus of claim 9, wherein the first radio access technology type is $4^{th}$ Generation (4G)/Long Term Evolution (LTE) and the second radio access technology type is $5^{th}$ Generation (5G) New Radio (NR).

13. The apparatus of claim 9, wherein the processor is further configured to perform:
repeating sending to the mobile core network encapsulated GTP-U protocol packets with the header comprising the 4-bit indication to indicate to the mobile core network that the radio access technology type is changed to the second radio access technology type from the first radio access technology type, the 3-bit indication to indicate to the mobile core network that the cell group is changed to the secondary cell group from the master cell group, and the 1-bit flag to indicate to the mobile core network whether the split bearer scenario is enabled or disabled until an acknowledgment is received from the mobile core network to the change in radio access technology type.

14. The apparatus of claim 9, wherein the 8-bit extension header is identified via a particular value in a GTP-U next extension header field of the encapsulated GTP-U protocol packet.

15. One or more non-transitory computer readable storage media encoded with instructions that, when executed by a processor of a radio access network element in a communication system that includes at least a first radio access network of a first radio access technology type and a second radio access network of a second radio access technology type, causes the processor of the radio access network element in the second radio access network to perform operations including:
receiving a data transmission from a user equipment that has dual connectivity capabilities for communication in both the first radio access network and the second radio access network;
determining whether there is a change in radio access technology type for the user equipment indicating that the user equipment has handed over from the first radio access network to the second radio access network;
in response to determining that the user equipment has changed radio access technology type, encapsulating data from the user equipment in a General Packet Radio Service (GPRS)-User Plane (GTP-U) protocol packet by providing an 8-bit extension header comprising a 4-bit indication to indicate to a mobile core network that the radio access technology type is changed to the second radio access technology type from the first radio access technology type, a 3-bit indication to indicate to the mobile core network that a cell group is changed to a secondary cell group from a master cell group, and a 1-bit flag to indicate to the mobile core network whether a split bearer scenario is enabled or disabled, to form an encapsulated GTPU-U protocol packet; and sending the encapsulated GTP-U protocol packet to the mobile core network to inform the mobile core network that the user equipment has changed to the second radio access technology type.

16. The one or more non-transitory computer readable storage media of claim 15, when it is determined that the user equipment has changed radio access technology type to the second radio access technology type from the first radio access technology type, encapsulating comprises setting a value of the 4-bit indication to indicate the radio access technology type is changed to the second radio access technology type, and setting a value of the 3-bit indication to indicate the cell group is changed to the secondary cell group.

17. The one or more non-transitory computer readable storage media of claim 15, wherein when it is determined that the user equipment has not changed radio access technology type, encapsulating comprises encapsulating the GTP-U protocol packet so as not to include the extension header when forming the encapsulated GTP-U protocol packet.

18. The one or more non-transitory computer readable storage media of claim 15, further comprising:

repeating sending to the mobile core network encapsulated GTP-U protocol packets with the 8-bit extension header comprising the 4-bit indication to indicate to the mobile core network that the radio access technology type is changed to the second radio access technology type from the first radio access technology type, the 3-bit indication to indicate to the mobile core network that the cell group is changed to the secondary cell group from the master cell group, and the 1-bit flag to indicate to the mobile core network whether the split bearer scenario is enabled or disabled until an acknowledgment is received from the mobile core network to the change in radio access technology type.

19. The one or more non-transitory computer readable storage media of claim 15, wherein the 8-bit extension header is identified via a particular value in a GTP-U next extension header field of the encapsulated GTP-U protocol packet.

20. The one or more non-transitory computer readable storage media of claim 15, wherein the first radio access technology type is $4^{th}$ Generation (4G)/Long Term Evolution (LTE) and the second radio access technology type is $5^{th}$ Generation (5G) New Radio (NR).

* * * * *